United States Patent
Xu et al.

(10) Patent No.: US 10,259,741 B2
(45) Date of Patent: Apr. 16, 2019

(54) HIGH STRENGTH GLASS FIBER

(71) Applicant: China Jiliang University, Hangzhou, Zhejiang (CN)

(72) Inventors: Shiqing Xu, Zhejiang (CN); Huanping Wang, Zhejiang (CN); Ren Gao, Zhejiang (CN); Qingong Zhu, Zhejiang (CN); Qinghua Yang, Zhejiang (CN); Hellmut Eckert, Zhejiang (CN); Xianghua Zhang, Zhejiang (CN)

(73) Assignee: China Jiliang University, Hangzhou, Zhejiang (CN)

(*) Notice: Subject to any disclaimer, the term of this patent is extended or adjusted under 35 U.S.C. 154(b) by 157 days.

(21) Appl. No.: 15/369,900

(22) Filed: Dec. 6, 2016

(65) Prior Publication Data
US 2017/0121205 A1 May 4, 2017

(30) Foreign Application Priority Data
Jul. 8, 2016 (CN) .......................... 2016 1 0536317

(51) Int. Cl.
| | |
|---|---|
| *C03B 1/00* | (2006.01) |
| *C03C 13/00* | (2006.01) |
| *C03B 37/02* | (2006.01) |
| *C03C 1/02* | (2006.01) |
| *C03B 19/06* | (2006.01) |
| *C03B 19/09* | (2006.01) |
| *C03B 19/10* | (2006.01) |

(52) U.S. Cl.
CPC ............... *C03C 13/00* (2013.01); *C03B 1/00* (2013.01); *C03B 19/06* (2013.01); *C03B 19/09* (2013.01); *C03B 19/1065* (2013.01); *C03B 37/02* (2013.01); *C03C 1/02* (2013.01); *C03C 2213/00* (2013.01)

(58) Field of Classification Search
CPC ....... C03C 13/00; C03C 2213/00; C03C 1/02; C03B 19/06; C03B 37/02; C03B 1/00
See application file for complete search history.

(56) References Cited

U.S. PATENT DOCUMENTS

| | | | |
|---|---|---|---|
| 4,830,989 A * | 5/1989 | Trivedi | ................. C03C 13/001 428/375 |
| 5,284,807 A * | 2/1994 | Komori | ................... C03C 3/091 501/35 |
| 6,386,002 B1 * | 5/2002 | Bhandarkar | ........ C01B 33/1417 423/338 |
| 2005/0065012 A1 * | 3/2005 | Rosenflanz | ............. C03C 3/125 501/41 |
| 2014/0130547 A1 * | 5/2014 | Shinohara | ................. C03B 1/02 65/29.16 |
| 2016/0068428 A1 * | 3/2016 | Li | ........................... C03C 13/00 501/38 |

* cited by examiner

Primary Examiner — John M Hoffmann

(57) ABSTRACT

A high strength glass fiber is prepared by following steps: weighing raw materials according to a mass percentage of 50-60% silica sol, 24-31% aluminum sol, 8-11% magnesia, 4-5% calcium oxide, 0.1-2% titanium dioxide, 0-0.5% ferric oxide, 0.5-2% niobium pentoxide, 0.5-1.5% antimony trioxide, 0.3-1.5% bismuth nitrate, and 0.1-0.5% boric acid. Deionized water is added. The raw material undergoes mixing by ball milling, spray-drying, calcining, isostatic pressing, melting, and wire-drawing. The invention adopts silicon sol, aluminum sol and bismuth nitrate. Through ball milling and spray-drying, silicon aluminum barium plasmas is evenly coated on surface of other oxide powders. Then nano particles, of silica, alumina and bismuth oxide are obtained by calcining. Under the effect of the high specific surface energy of nano particles, and the close contact of each component, high strength glass fiber is obtained in relatively low fiber drawing temperature while the glass melting temperature and time are significantly reduced.

1 Claim, No Drawings

HIGH STRENGTH GLASS FIBER

CROSS REFERENCE OF RELATED APPLICATION

The present invention claims priority under 35 U.S.C. 119(a-d) to CN 201610536317.6, filed Jul. 8, 2016.

BACKGROUND OF THE PRESENT INVENTION

Field of Invention

The present invention relates to a high strength glass fiber which belongs to a technical field of material science.

Description of Related Arts

With the continuous development of wind power technology, the low-cost large-scale production of the high-strength fiber has attracted more attentions of manufacturers. The key of the low-cost large-scale development of the wind power is to reduce the difficulty of fiber drawing process, and simultaneously to ensure that the fiber meets the high-strength requirements of large-size fan blades. Therefore, the developed countries, which are advanced in the wind power technology, focus on the research of the high-strength fiber to resolve the large-scale of the fan blades. Currently, the high-strength fiber is mainly divided into two types: carbon fiber and glass fiber. Although the carbon fiber has good insulation and corrosion resistance, it has high production cost and complex process. The glass fiber has not only high mechanical strength, but also low production cost, so that it is suitable for large-scale production. Thus, glass fiber has become the research hotspot of the high-strength fiber in last decades.

The first high-strength glass fiber can be traced back to the S series of glass fiber developed by the United States AGY Corporation in 1968, which is researched and developed to meet the need of military development. Then other countries have also developed similar high-strength glass fiber, such as Japanese "T" fiber, French "R" fiber and Chinese "HS" series of fiber. These high-strength glass fibers have very excellent mechanical properties. However, they are unable to achieve large-scale production in the modern tank furnace due to too high molding temperature and large production difficulty, which limits their applications in the military field.

In the $21^{st}$ century, the glass fiber industry has been flouring and the market continues to expand. The major glass fiber companies have developed new generations of high-strength glass fiber. At the same time, the theoretical level, the production equipments and the fabrication technology of the glass fiber are also continuously improved. Currently, the best high strength glass fiber is $SiO_2$—$Al_2O_3$—$MgO$—$CaO$ series. For example, the U.S. Pat. No. 3,402,055 discloses a high strength glass fiber whose component is 65% $SiO_2$, 25% $Al_2O_3$ and 10% $MgO$, is adapted to the formation of S-2™ glass. The new single-filament strength of this glass fiber is 4600-4800 MPa. The upper crystallization temperature is 1464° C. and the fiber drawing temperature is 1471° C., which indicates the fiber possesses high mechanical strength and good high-temperature performance. However, the melting temperature and fiber it is not easy to draw fiber because of its large viscosity and high drawing temperature, which results in the high production cost.

In order to reduce the melting temperature and wire drawing temperature of the glass fiber, the major glass fiber companies and research institutes tend to add a various fluxing agent, in the basis of $SiO_2$—$Al_2O_3$—$MgO$—$CaO$ substrate. For example, Advantex™ glass fiber, produced by Owens-Corning Co., Ltd., comprises 59-62% $SiO_2$, 20-24% $CaO$, 12-15% $Al_2O_3$, 1.0-4.0% $MgO$, 0-2% $Na_2O$, 0-2% $K_2O$, 0-0.9% $TiO_2$, 0-0.5% $Fe_2O_3$ and 0-0.9% F. A large amount of fluoride and alkali metal oxide are introduced into the glass system, so that the melting temperature and the wire drawing temperature are greatly reduced. The melting temperature, the upper crystallization temperature and the wire drawing temperature of the glass are 1480° C., 1204° C. and 1260° C., respectively. However, because a large amount of fluoride and alkali metal oxidation are introduced into the glass, the new single-fiber ecological strength is only 3100-3800 MPa. The domestic HS series glass fiber is similar to the Advantex™ glass fiber. The composition of the HS series glass fiber is as follows: 52-66% $SiO_2$, 16-26% $CaO$, 12-16% $Al_2O_3$, 5-10% $H_3BO_3$, 0-5% $MgO$, 0-2% $Na_2O+K_2O$, 0-0.8% $TiO_2$, 0-5% $Fe_2O_3$ and 0-1.0% F. A large amount of alkali metal oxide, fluoride and boric acid are introduced into the HS series glass system, so that the melting temperature and the wire drawing temperature of the glass are greatly reduced. The melting temperature and the wire drawing temperature of the glass are 1465° C. and 1350° C., respectively, and the new single-fiber ecological strength is only 3600-4000 MPa. Moreover, the composition of the French R-glass fiber is as follows: 59-62% $SiO_2$, 20-28% $CaO$, 12-15% $Al_2O_3$, 1.0-4.0% $MgO$, 0-2% $Na_2O$, 0-2% $K_2O$, 0-2% $CeO_2$, 0-0.5% $Fe_2O_3$, and 0-0.9% F. A large amount of $Na^+$, $K^+$, and $Ce^{4+}$ are introduced into the French R-glass system to reduce the high-temperature viscosity and melting temperature. The melting temperature and the wire drawing temperature of the glass are 1450° C. and 1280° C., respectively, and the new single-fiber ecological strength is only 3200-3400 MPa.

Therefore, while ensuring the high strength of glass fiber, reducing the glass melting temperature and wire drawing operation temperature has important significance for mass production and reducing energy consumption.

SUMMARY OF THE PRESENT INVENTION

An object of the present invention is to provide a high strength glass fiber, with low glass melting and fiber-forming temperature, which can reduce energy consumption during production effectively.

The high strength glass fiber, provided by the present invention, is prepared by a method which comprises steps of:

(1) weighing in a basis of a mass percentage of following raw materials, at a same time, weighing zirconia grinding ball 4-5 times the weight of the raw materials and deionized water 1-2 times the weight of the raw materials, then ball milling for 12-24 hours and obtaining a mixture, wherein: a mass percentage of the raw materials is as follows:

| | |
|---|---|
| silica sol | 50-60%; |
| aluminum sol | 24-31%; |
| magnesia | 8-11%; |
| calcium oxide | 4-5%; |
| titanium dioxide | 0.1-2%; |
| ferric oxide | 0-0.5%; |
| niobium pentoxide | 0.5-2%; |
| antimony trioxide | 0.5-1.5%; |
| bismuth nitrate | 0.3-1.5%; and |
| boric acid | 0.1-0.5%; |

(2) spray-drying the mixture through an atomizer, removing the deionized water, and obtaining a powder material, wherein: an inlet air temperature of spray-drying is 180-280° C. and an outlet air temperature thereof is 30-100° C.;

(3) calcining the powder material at 700-900° C. for 1-3 hours, and then, cooling the calcined powder material to a room temperature;

(4) putting the calcined and cooled powder material into a rubber mold, isostatic pressing at 100-300 MPa in a cold isostatic press, and obtaining a compact block;

(5) putting the compact block into a crucible, melting at 1400-1450° C. for 2-3 hours, and obtaining a molten glass fluid; and (6) decreasing a temperature of the glass fluid to 1250-1300° C., then beginning to wire-drawing, and obtaining a continuous fiber with a size of 5-12 µm, wherein a rotating speed of a wire drawing machine is 1000-1400 r/min.

The present invention has beneficial effects as follows.

For the high strength glass fiber, provided by the present invention, in the preparation processes, niobium pentoxide and antimony trioxide are introduced to defoam for clarifying the glass fluid, In this way, the strong intensity can be reserved, and the melting time And energy cost are effectively reduced. Bismuth nitrate is introduced to effectively reduce the high temperature viscosity and the molding temperature of the glass without affecting the glass strength, so as to reduce the melting temperature of the glass and decrease the melting time. Silica sol, aluminum sol and bismuth nitrate are used as the raw materials, the deionized water is added to the raw materials, and then mixed by ball milling and spray-dried, for evenly coating silicon aluminum barium plasmas on a surface of other oxide powders, and then is calcined, for obtaining nano-silica particles, nano-alumina particles and nano-bismuth oxide particles. Under the effect of the high specific surface energy of the nano particles, and the close contact of each component through isostatic pressing, the melting temperature and the melting time of the glass are significantly reduced, so that under the relatively low melting temperature and wire-drawing temperature, the present invention obtains the high strength glass fiber.

These and other objectives, features, and advantages of the present invention will become apparent from the following detailed description, the accompanying drawings, and the appended claims.

DETAILED DESCRIPTION OF THE PREFERRED EMBODIMENT

The present invention is further explained with accompanying embodiments.

Embodiment 1

Weigh 60% silica sol, 25% aluminum sol, 9% magnesia, 4% calcium oxide, 0.5% titanium dioxide, 0.1% ferric oxide, 0.5% niobium pentoxide, 0.5% antimony trioxide, 0.3% bismuth nitrate, and 0.1% boric acid according to a mass percentage. Simultaneously, weigh zirconia grinding ball 5 times the weight of the raw materials and deionized water twice the weight of the raw materials, mixed by ball milling for 24 hours and obtain a mixture. The mixture is spray-dried through an atomizer. In order to remove the deionized water, then a powder material is obtained, wherein: an inlet air temperature of spray-drying is 200° C. and an outlet air temperature thereof is 30° C. Then, the powder material is placed in an electric furnace and calcined at 800° C. for 2 hours, and then cooled to a room temperature. The calcined and furnace-cooled powder material is put into a rubber mold and isostatic pressed at 200 MPa, thus a compact block is obtained. The compact block is put into a crucible and molten at 1450° C. for 3 hours, and a molten glass fluid is obtained. Finally, a temperature of the glass fluid is decreased to 1300° C., wire-drawing is begun, and a continuous fiber is obtained with a size of 12 µm, namely, the high strength glass fiber provided by the present invention is obtained, wherein a rotating speed of a wire drawing machine is 1000 r/min.

A measurement method of the monofilament strength of the glass is as follows.

An unworn single fiber between a leak and a forming tube is taken through a sampler and a sample strip. Strength measurement is done through strength tester type UTM-11-22. A fiber diameter is measured through a measuring microscope under 800 times magnification. Strength measurement is done in the following condition: 10 mm fiber length, 8 mm/min stretching rate, 22-25° C. environmental temperature and 40-55% humidity. In this way, the measured stretching strength of the fiber monofilament is 4951 MPa.

Embodiment 2

Weigh 57% silica sol, 25% aluminum sol, 8% magnesia, 5% calcium oxide, 1% titanium dioxide, 0.5% ferric oxide, 0.7% niobium pentoxide, 1.5% antimony trioxide, 1% bismuth nitrate, and 0.3% boric acid according to a mass percentage. Simultaneously, weigh zirconia grinding ball 4 times the weight of the raw materials and deionized water once the weight of the raw materials, mixed by ball milling for 12 hours and obtain a mixture. The mixture is spray-dried through an atomizer, so as to remove the deionized water, and a powder material is obtained, wherein: an inlet air temperature of spray-drying is 180° C. and an outlet air temperature thereof is 100° C. Then, the powder material is placed in an electric furnace and calcined at 700° C. for 3 hours, and then cooled to a room temperature. The calcined and furnace-cooled powder material is put into a rubber mold and isostatic pressed at 100 MPa, thus a compact block is obtained. The compact block is put into a crucible and molten at 1425° C. for 2.5 hours, and a molten glass fluid is obtained. Finally, a temperature of the glass fluid is decreased to 1275° C., wire-drawing begins, and a continuous fiber is obtained with a size of 10 µm, namely, the high strength glass fiber provided by the present invention is obtained, wherein a rotating speed of a wire drawing machine is 1200 r/min.

A measurement method of the monofilament strength of the glass is as follows. An unworn single fiber between a leak and a forming tube is taken through a sampler and a sample strip. Strength measurement is done through strength tester type UTM-11-22. A fiber diameter is measured through a measuring microscope under 800 times magnification. Strength measurement is done in the following condition: 10 mm fiber length, 8 mm/min stretching rate, 22-25° C. environmental temperature and 40-55% humidity. In this way, the measured stretching strength of the fiber monofilament is 4907 MPa.

Embodiment 3

Weigh 53% silica sol, 24% aluminum sol, 11% magnesia, 5% calcium oxide, 2% titanium dioxide, 0.1% ferric oxide, 2% niobium pentoxide, 0.9% antimony trioxide, 1.5% bismuth nitrate, and 0.5% boric acid according to a mass percentage. Simultaneously, weigh zirconia grinding ball 4.5 times the weight of the raw materials and deionized water 1.5 times the weight of the raw materials, mixed by ball milling for 20 hours and obtain a mixture. The mixture is spray-dried through an atomizer, so as to remove the deionized water, and a powder material is obtained, wherein: an inlet air temperature of spray-drying is 280° C. and an outlet air temperature thereof is 50° C. The powder material is placed in an electric furnace and calcined at 900° C. for 1 hour, and then is furnace-cooled to a room temperature. The calcined and furnace-cooled powder material is put into a rubber mold and isostatic pressed at 300 MPa, thus a compact block is obtained. The compact block is put into a crucible and molten at 1400° C. for 2 hours, and a molten glass fluid is obtained. Finally, a temperature of the glass fluid is decreased to 1250° C., wire-drawing begins, and a continuous fiber is obtained with a size of 5 μm, namely, the high strength glass fiber provided by the present invention is obtained, wherein a rotating speed of a wire drawing machine is 1400 r/min.

A measurement method of the monofilament strength of the glass is as follows.

An unworn single fiber between a leak and a forming tube is taken through a sampler and a sample strip. Strength measurement is done through strength tester type UTM-11-22. A fiber diameter is measured through a measuring microscope under 800 times magnification. Strength measurement is done in the following condition: 10 mm fiber length, 8 mm/min stretching rate, 22-25° C. environmental temperature and 40-55% humidity. In this way, the measured stretching strength of the fiber monofilament is 4839 MPa.

Embodiment 4

Weigh 50% silica sol, 31% aluminum sol, 11% magnesia, 4.5% calcium oxide, 0.1% titanium dioxide, 1% niobium pentoxide, 1% antimony trioxide, 1% bismuth nitrate, and 0.4% boric acid according to a mass percentage. Simultaneously, weigh zirconia grinding ball 4 times the weight of the raw materials and deionized water twice the weight of the raw materials, mixed by ball milling for 18 hours and obtain a mixture. The mixture is spray-dried through an atomizer, so as to remove the deionized water, and a powder material is obtained, wherein: an inlet air temperature of spray-drying is 250° C. and an outlet air temperature thereof is 80° C. Then, the powder material is placed in an electric furnace and calcined at 850° C. for 2 hours, and then is furnace-cooled to a room temperature. The calcined and furnace-cooled powder material is put into a rubber mold and isostatic pressed at 250 MPa, and then a compact block is obtained. The compact block is put into a crucible and molten at 1420° C. for 3 hours, and a molten glass fluid is obtained. Finally, a temperature of the glass fluid is decreased to 1270° C., wire-drawing begins, and a continuous fiber is obtained with a size of 8 μm, namely, the high strength glass fiber provided by the present invention is obtained, wherein a rotating speed of a wire drawing machine is 1300 r/min.

A measurement method of the monofilament strength of the glass is as follows. An unworn single fiber between a leak and a forming tube is taken through a sampler and a sample strip. Strength measurement is done through strength tester type UTM-11-22. A fiber diameter is measured through a measuring microscope under 800 times magnification. Strength measurement is done in the following condition: 10 mm fiber length, 8 mm/min stretching rate, 22-25° C. environmental temperature and 40-55% humidity. In this way, the measured stretching strength of the fiber monofilament is 4935 MPa.

One skilled in the art will understand that the embodiment of the present invention as shown in the drawings and described above is exemplary only and not intended to be limiting.

It will thus be seen that the objects of the present invention have been fully and effectively accomplished. Its embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A method for preparing a glass fiber, comprising steps of:
(1) weighing in a basis of a mass percentage of raw materials, respectively weighing zirconia grinding ball 4-5 times a weight of the raw materials and deionized water 1-2 times the weight of the raw materials, then ball milling the raw materials, the zirconia grinding ball and the deionized water for 12-24 hours and obtaining a mixture, wherein: the mass percentage of the raw materials is as follows:

| | |
|---|---|
| silica sol | 50-60%; |
| aluminum sol | 24-31%; |
| magnesia | 8-11%; |
| calcium oxide | 4-5%; |
| titanium dioxide | 0.1-2%; |
| ferric oxide | 0-0.5%; |
| niobium pentoxide | 0.5-2%; |
| antimony trioxide | 0.5-1.5%; |
| bismuth nitrate | 0.3-1.5%; and |
| boric acid | 0.1-0.5%, | wherein a sum of the mass percentage of the raw materials is 100%;
(2) spray-drying the mixture through an atomizer, and obtaining a powder material, wherein: an inlet air temperature of spray-drying is in a range of 180-280° C. and an outlet air temperature thereof is in a range of 30-100° C.;
(3) calcining the powder material at 700-900° C. for 1-3 hours, and then cooling the calcined powder material to a room temperature;
(4) putting the calcined and cooled powder material into a rubber mold, isostatic pressing at 100-300 MPa in a cold isostatic press, and obtaining a compact block;
(5) putting the compact block into a crucible, melting at 1400-1450° C. for 2-3 hours, and obtaining a molten glass fluid; and
(6) decreasing a temperature of the glass fluid to a range of 1250-1300° C., and then performing fiber-drawing through a fiber drawing machine, and finally obtaining a continuous fiber with a size of 5-12 μm, wherein a rotating speed of the fiber drawing machine is in a range of 1000-1400 r/min.

* * * * *